(12) United States Patent
Harness et al.

(10) Patent No.: US 7,412,130 B2
(45) Date of Patent: Aug. 12, 2008

(54) FIBER OPTIC OVERMOLD METHOD AND PRODUCT

(75) Inventors: Weston Lee Harness, Grand Rapids, MI (US); John E. Calow, Plainwell, MI (US)

(73) Assignee: X-Rite, Inc., Grand Rapids, MI (US)

( * ) Notice: Subject to any disclaimer, the term of this patent is extended or adjusted under 35 U.S.C. 154(b) by 0 days.

(21) Appl. No.: 11/522,585

(22) Filed: Sep. 18, 2006

(65) Prior Publication Data

US 2008/0069500 A1 Mar. 20, 2008

(51) Int. Cl.
G02B 6/26 (2006.01)
G02B 6/32 (2006.01)
B29D 11/00 (2006.01)

(52) U.S. Cl. .......................... 385/31; 385/33; 264/1.25
(58) Field of Classification Search ....................... None
See application file for complete search history.

(56) References Cited

U.S. PATENT DOCUMENTS

| 4,330,171 | A |   | 5/1982  | Malsot et al.       |
| 4,359,435 | A | * | 11/1982 | Kogure ........................ 264/40.5 |
| 4,790,295 | A | * | 12/1988 | Tashiro ........................ 600/176 |
| 5,204,425 | A | * | 4/1993  | Sekimoto et al. ............ 526/268 |
| 6,343,177 | B1 |  | 1/2002  | Estoque et al. |
| 2001/0033712 | A1 |  | 10/2001 | Cox et al. |
| 2005/0163441 | A1 |  | 7/2005  | Jitsuno et al. |

FOREIGN PATENT DOCUMENTS

| EP | 0 156 182  | 10/1985 |
| JP | 61137109   | 6/1986  |
| JP | 01166007   | 6/1989  |
| JP | 06113011   | 4/1994  |
| JP | 2000/321446 | 11/2000 |
| WO | WO00/46622 | 8/2000 |

OTHER PUBLICATIONS

European Search Report dated Dec. 28, 2007.

* cited by examiner

*Primary Examiner*—Hemang Sanghavi
*Assistant Examiner*—Omar Rojas
(74) *Attorney, Agent, or Firm*—McCarter & English, LLP

(57) ABSTRACT

A termination is formed on an optical fiber by securing the fiber in a mold which defines a cavity for forming the termination. A liquid is injected into the cavity, which solidifies to form the termination. At least a portion of the mold is removed to expose the termination.

13 Claims, 23 Drawing Sheets

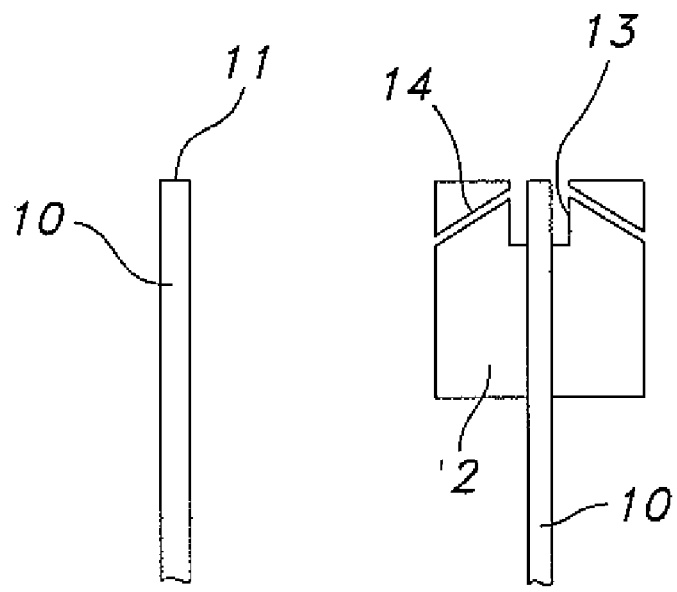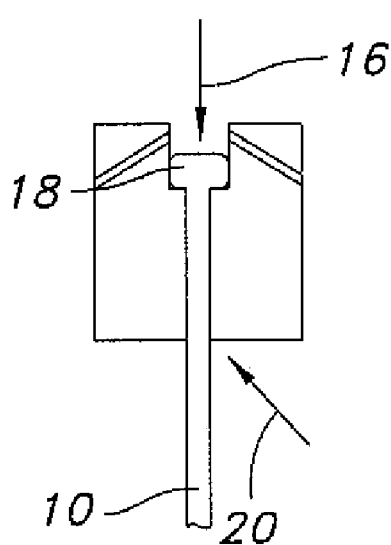
FIG. 1  FIG. 2  FIG. 3
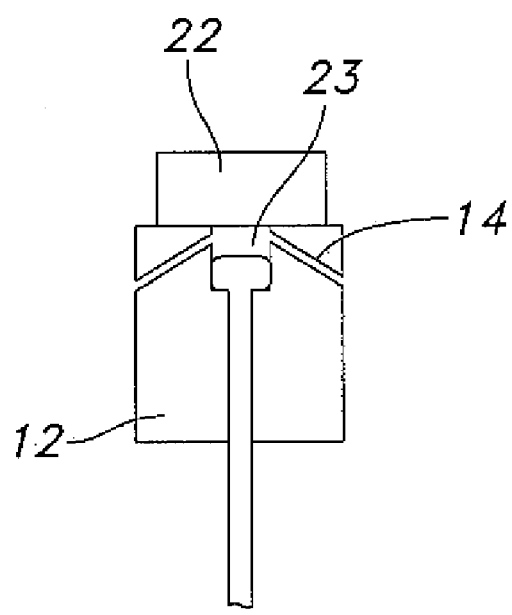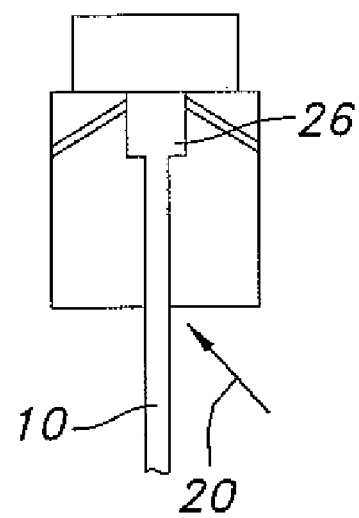
FIG. 4  FIG. 5

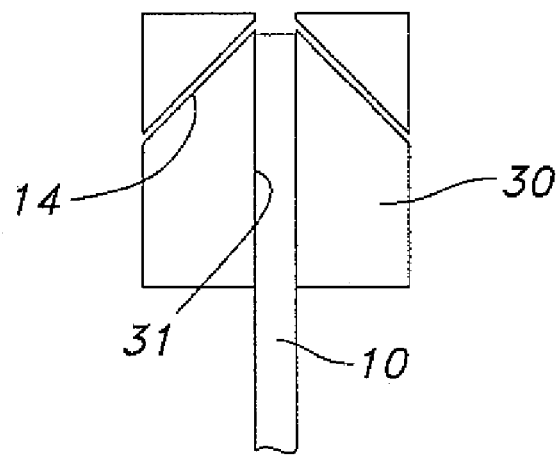
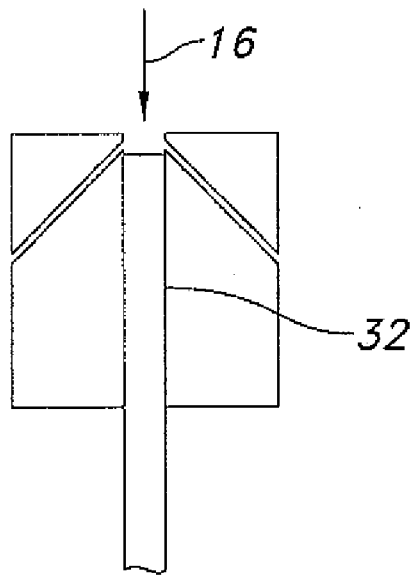
FIG. 8    FIG. 9
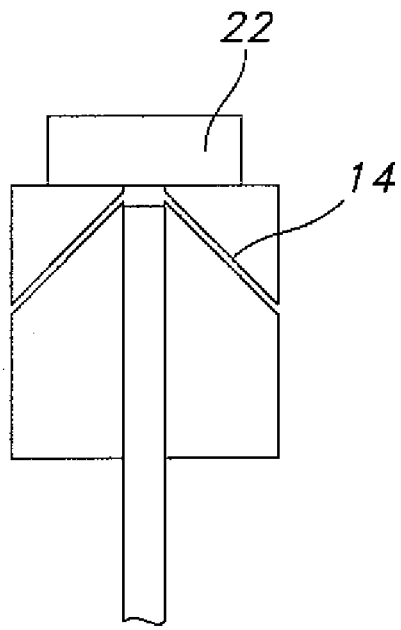
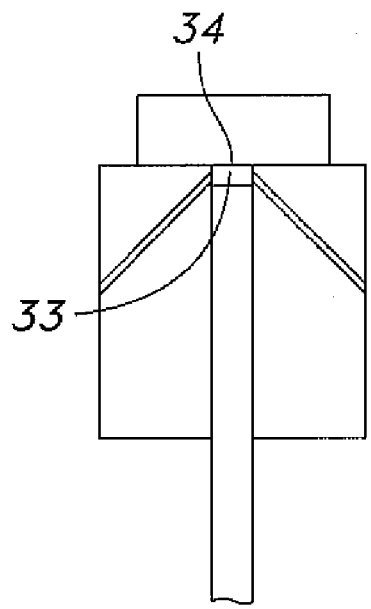
FIG. 10    FIG. 11

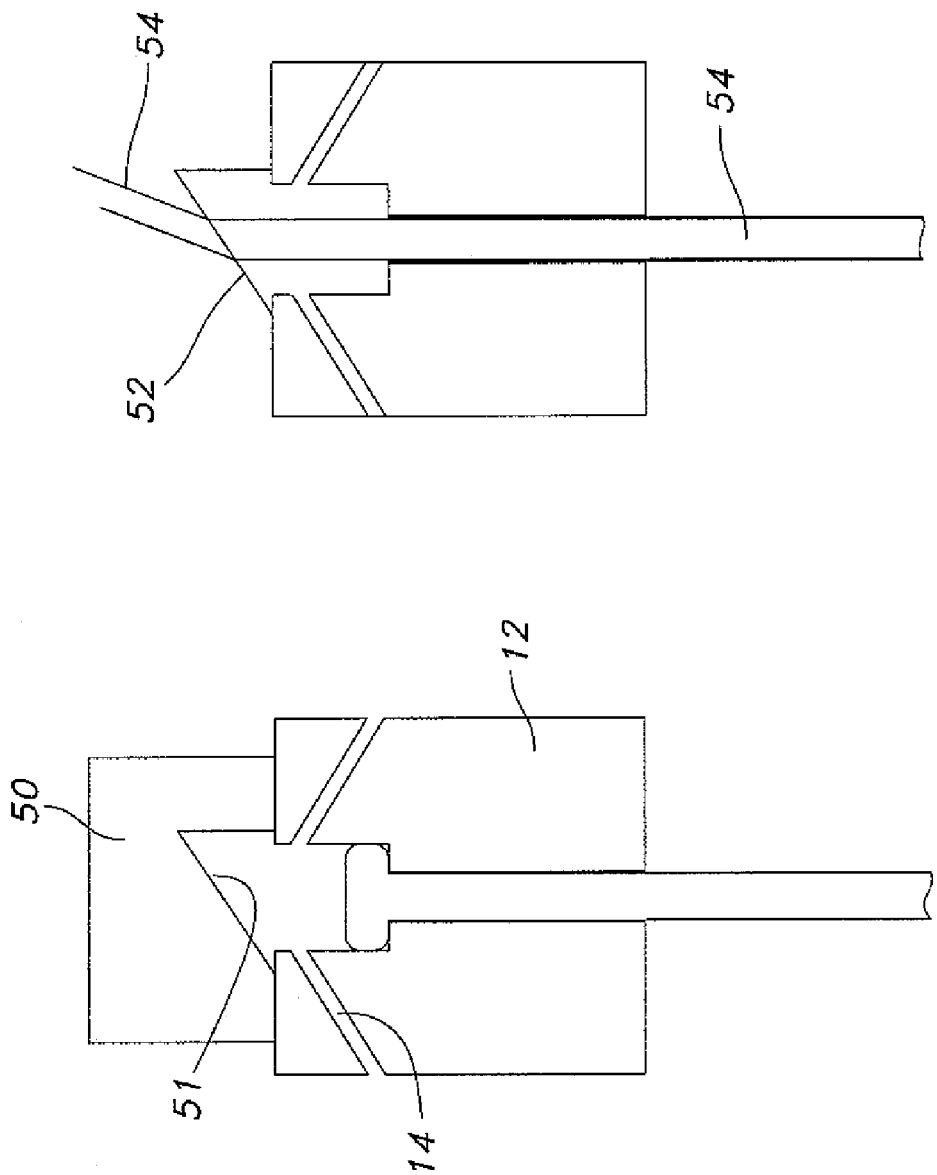

```
┌─────────────────────────────────┐
│  Inject liquid into the Second Cavity,  │
│   the Liquid Solidifying to form        │
│        a Second Termination             │
│                440                      │
└─────────────────────────────────┘
                 ⇩
┌─────────────────────────────────┐
│     Remove Second Mold Portion          │
│   to Expose the Second Termination      │
│                445                      │
└─────────────────────────────────┘
                 ⇩
┌─────────────────────────────────┐
│       Attach the First Mold Portion     │
│         to the Second Mold Portion      │
│     so that the First Flat Surface Portion │
│   is adjacent the Second Flat Surface Portion │
│     and the First Optical Fiber is in Optical │
│                Communication            │
│        with the Second Optical Fiber    │
│                450                      │
└─────────────────────────────────┘
```

FIG. 38B

FIBER OPTIC OVERMOLD METHOD AND PRODUCT

BACKGROUND

The present invention relates to fiber optics and, more particularly, relates to termination of optical fibers.

It is common practice today, when it is necessary to provide a termination for an optical fiber, to polish the end of the fiber to a mirror finish and to employ transparent adhesives. Polishing the fiber is a time consuming step, and adhesives leave much to be desired for terminating optical fibers. For one thing, adhesives take some time to cure or set, which increases manufacturing costs. Furthermore, adhesives may have bubbles, which interfere with transmission of light, and adhesives do not solidify to form precisely-defined shapes.

SUMMARY

In one aspect, the present invention is directed to a method for providing a termination on at least one optical fiber. The method includes attaching the optical fibers(s) to a housing, attaching a mold portion to the housing whereby the mold portion and the housing cooperate to form a cavity, the cavity defining a shape for the termination. The termination is created by injecting a liquid into the cavity. The mold portion is then removed to expose the termination. The termination can be lensed or flat to create specific optical properties.

In another aspect, the present invention is directed to a method for forming a lens integral with a termination on at least one optical fiber. The lens may be for receiving light reflected back from a subject illuminated by light from the optical fiber(s), or for transmitting light to a subject. The method may include providing a housing including one or more first passages for the optical fiber(s), the housing further including a second passage to accommodate light from the lens. The optical fiber(s) may be placed in and secured in the first passage(s). A first mold portion may be attached to the housing and a second mold portion may be placed in the second passage, so that the first mold portion, the housing and the second mold portion cooperate to form a cavity, the cavity defining a shape of the termination including the lens. A liquid may then be injected into the cavity, the liquid solidifying to form a transparent solid. The first mold portion and the second mold portion may then be removed to expose the termination including the lens.

In an additional aspect, the present invention is directed to an apparatus including an optical fiber, a housing for holding the optical fiber, the optical fiber passing through the housing. The apparatus also includes an integral termination continuous with the fiber, the integral termination being in contact with the housing.

In yet another aspect, the present invention is directed to a connector pair for joining a first at least one optical fiber to a second at least one optical fiber. The connector pair may include a first connector, the first connector including a first housing for holding the first at least one optical fiber, the first at least one optical fiber passing through the first housing. It may also include a first termination in contact with the first housing, the first termination being optically continuous with the first at least one optical fiber, and it has substantially the same index of refraction as the first at least one optical fiber. The first termination may include a first flat surface portion. The connector pair also includes a second connector, and the second connector may include a second housing for holding the second at least one optical fiber, the second at least one optical fiber passing through the second housing. It may also include a second termination in contact with the second housing. The second termination may be optically continuous with the second at least one optical fiber, and it may have the same index of refraction as the second at least one optical fiber. The second termination may also include a second flat surface portion. The connector pair may also include attachment means for joining the first connector to the second connector so that the first flat surface portion on the first termination is adjacent to the second flat surface portion on the second termination so that each fiber of the first at least one optical fiber is in optical communication with a corresponding fiber in the second at least one optical fiber.

In still another aspect, the present invention is directed to a method for providing a termination integral with at least one optical fiber. The method may include the step of providing a mold, the mold defining a cavity shaped to form the termination. It may also include inserting the optical fiber(s) into the mold so that the optical fiber(s) terminate in the cavity. The fiber(s) may be secured in the mold, and a liquid may be injected into the cavity, the liquid solidifying to form the termination integral with the optical fiber(s)). The fibers, preferably are secured in the mold to prevent them from being expelled by pressure of the liquid, and to prevent loss of liquid around the fibers. The mold may then be removed to expose the termination.

In still yet another aspect, the present invention teaches a method of connecting a first optical fiber to a second optical fiber so that the first optical fiber is in optical communication with the second optical fiber. The method comprises attaching the first optical fiber to a first housing, attaching a first mold portion to the first housing so that the first mold portion and the first housing form a first cavity, the first cavity defining a shape of a first termination, the termination comprising a first flat surface portion, and it comprises injecting a liquid into the first cavity, the liquid solidifying to form the first termination, and it comprises removing the first mold portion to expose the first termination. The method further comprises attaching the second optical fiber to a second housing, attaching a second mold portion to the second housing so that the second mold portion and the second housing form a second cavity, the second cavity defining a shape of a second termination, the second termination comprising a second flat surface portion. The method also comprises injecting a liquid into the second cavity, the liquid solidifying to form the second termination, and it comprises removing the second mold portion to expose the second termination. It also comprises attaching the first termination to the second termination so that the first flat surface portion is adjacent the second flat surface portion so that the first optical fiber is in optical communication with the second optical fiber.

BRIEF DESCRIPTION OF THE DRAWINGS

FIG. 1 is an illustration of an optical fiber that is to be provided with a termination, according to various embodiments of the present invention;

FIG. 2 is a sectional view of a housing which serves as a portion of a mold for casting a termination on the optical fiber, the housing having a counterbore, according to various embodiments of the present invention;

FIG. 3 illustrates the housing and fiber of FIG. 2 with heat applied, according to various embodiments of the present invention;

FIG. 4 is an illustration of a mold portion placed against the housing, according to various embodiments of the present invention;

FIG. 5 is an illustration of the fiber with its termination before the mold portion is removed, according to various embodiments of the present invention;

FIG. 8 is an illustration of a fiber and a housing lacking a counterbore, according to various embodiments of the present invention;

FIG. 9 illustrates an optical fiber with heat being applied to its end, according to various embodiments of the present invention;

FIG. 10 is an illustration of a mold portion placed against the housing, according to various embodiments of the present invention;

FIG. 11 is an illustration of the fiber with its termination after the mold portion is removed, according to various embodiments of the present invention;

FIG. 16 is an illustration of a balled fiber in a housing, the balled fiber creating a shut-off for molding, and a mold portion configured to define an angled termination, according to various embodiments of the present invention;

FIG. 17 is an illustration of an angled termination and two light rays which are redirected by said angled termination, according to various embodiments of the present invention;

FIGS. 38A and 38B show a flowchart, according to various embodiments of the present invention, for connecting a first optical fiber to a second optical fiber.

DESCRIPTION

Figure 6:
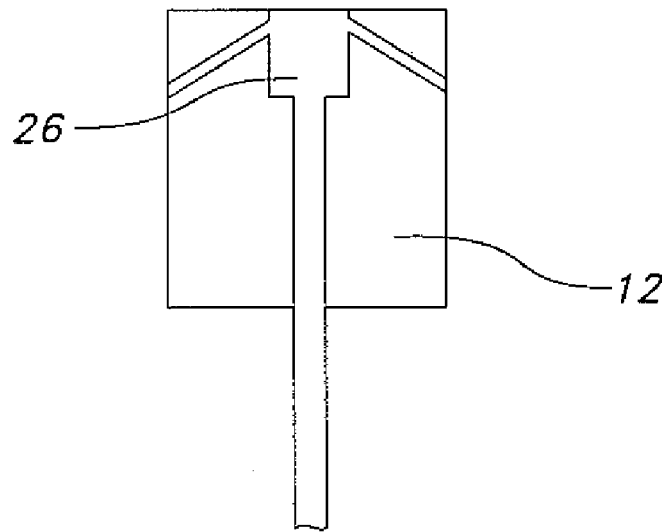
FIG. 6 is an illustration of the fiber with its termination after the mold portion is removed, according to various embodiments of the present invention.

FIG. 1 illustrates a proximal end portion of an optical fiber 10 that may be provided with a termination. It is preferred that the proximal end 11 of the optical fiber 10 be cleanly cut. Optical fiber 10 may be acrylic, or in various embodiments, may be other transparent organics, glass, etc.

FIG. 2 illustrates the fiber 10 inserted into a housing 12 having a counterbore 13. In various embodiments, the housing 12 may define runners 14 for supplying liquid for a casting step, for example, as described below.

To prevent the fiber 10 from being ejected from the housing 12 due to casting pressure, heat 16 may be applied to the proximal end of fiber 10 to create a balled end 18, as shown in FIG. 3. Balled ends such as balled end 18 tend to form on acrylic and similar fibers to reduce the surface energy of fiber 10, and also are formed because, typically, an acrylic fiber will have molecules parallel to the fiber axis, and these cause the fiber to shorten and increase its diameter when the fiber is heated. Heat 16 may be in any suitable form including, for example, radiation, a stream of hot gas, etc. Cooling 20 may be supplied at the distal end of housing 12 to prevent embrittlement of the adjacent portion of fiber 10. Cooling 20 may be a stream of cold air.

FIG. 4 illustrates a mold portion 22 that cooperates with housing 12 to define a mold cavity 23.

FIG. 5 illustrates the cast product after a liquid is injected through runners 14 to fill cavity 23. In various embodiments, the liquid may have the same composition as the fiber 10. The liquid solidifies to form termination 26 on optical fiber 10. Again, cooling 20 may be applied at the distal end of housing 12 to prevent embrittlement of fiber 10. Termination 26 may be transparent, and it may have an index of refraction substantially matching the index of refraction of fiber 10.

Figure 7:
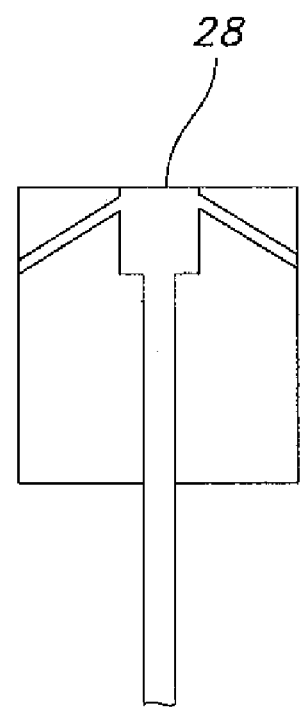
FIG. 7 is an illustration of a non-reflective layer and a hardcoat on the termination, according to various embodiments of the present invention.

FIG. 6 illustrates the optical fiber with termination 26 disposed in housing 12. FIG. 7 illustrates an additional layer comprising an anti-reflective layer and a hardcoat that, optionally, may be applied to the surface of the termination 26.

FIGS. 8-11 illustrate an arrangement, according to various embodiments of the present invention, that does not require the step of balling the proximal end of optical fiber 10. FIG. 8 illustrates optical fiber 10 placed in bore 31 in housing 30. In FIG. 9, heat 16 is supplied to increase the diameter of optical fiber and cause it to swell and press against the bore 31. In this manner, optical fiber 10 is secured in housing 30. An optional modification of this procedure is to employ a housing of a composition to which optical fiber 10 adheres when it is heated.

In FIG. 10, mold portion 22 is put in place, and casting liquid is introduced through runners 14 to produce a termination 33 on optical fiber 10, which is seen in FIG. 11. Termination 33 may have a planar surface portion 34.

Figure 12:
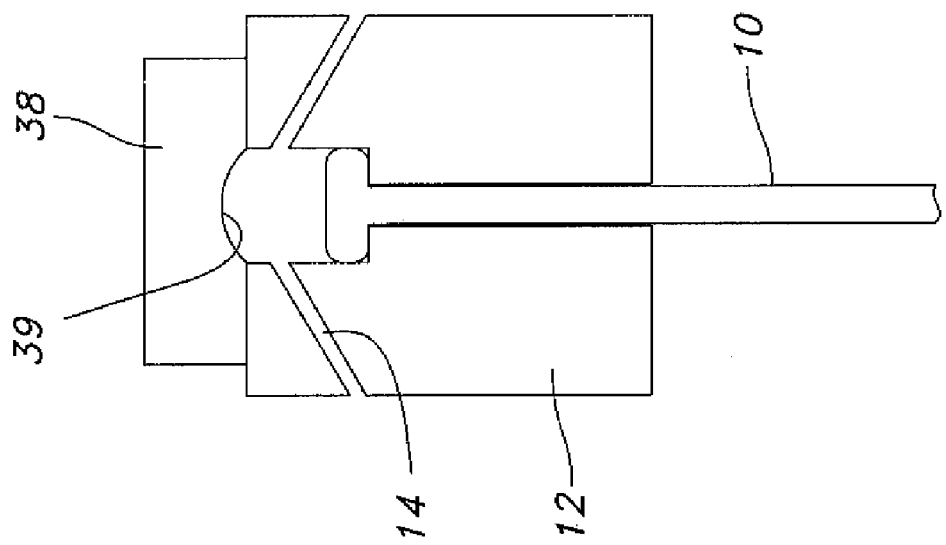
FIG. 12 is an illustration of a balled fiber in a housing, and a mold portion configured to define a convex termination, according to various embodiments of the present invention.

FIG. 12 illustrates an arrangement for casting a termination having a convex surface portion 40. Housing 12 is covered by mold portion 38 having a concave surface portion 39.

Figure 13:
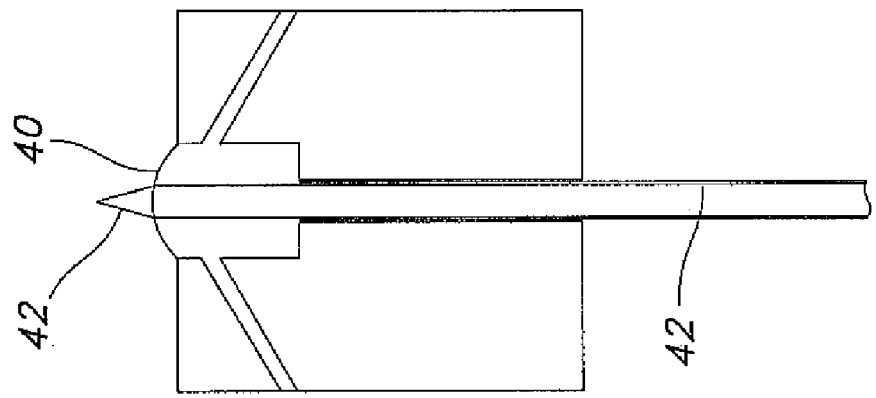
FIG. 13 is an illustration of a convex termination and two light rays which converge after exiting from the termination, according to various embodiments of the present invention.

FIG. 13 illustrates a termination having a convex surface portion 40, as cast by the arrangement illustrated in FIG. 12. Convex surface portion 40 causes parallel light rays 42 from optical fiber 10 to be converged, as shown.

Figure 14:
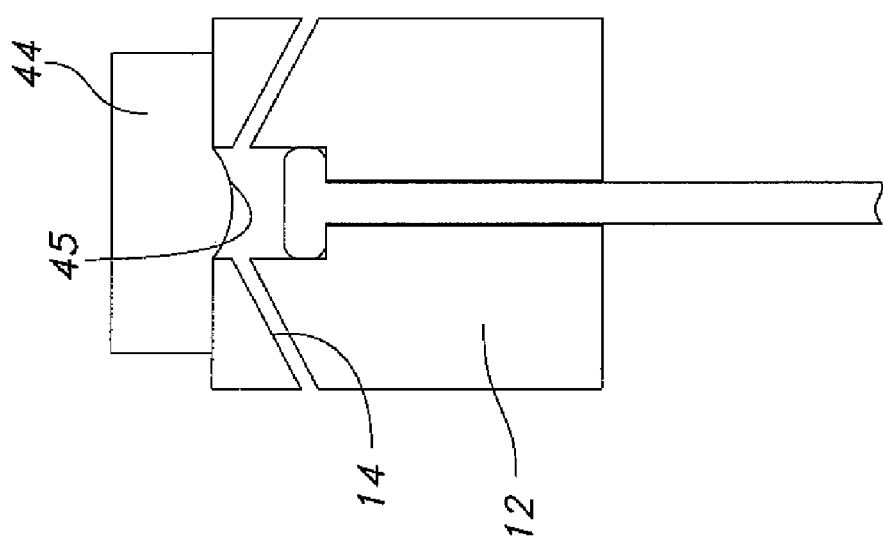
FIG. 14 is an illustration of a balled fiber in a housing, the balled fiber creating a shut-off for molding, and a mold portion configured to define a concave termination, according to various embodiments of the present invention.

FIG. 14 illustrates an arrangement for casting wherein housing 12 is covered by mold portion 44 having convex surface portion 45.

Figure 15:
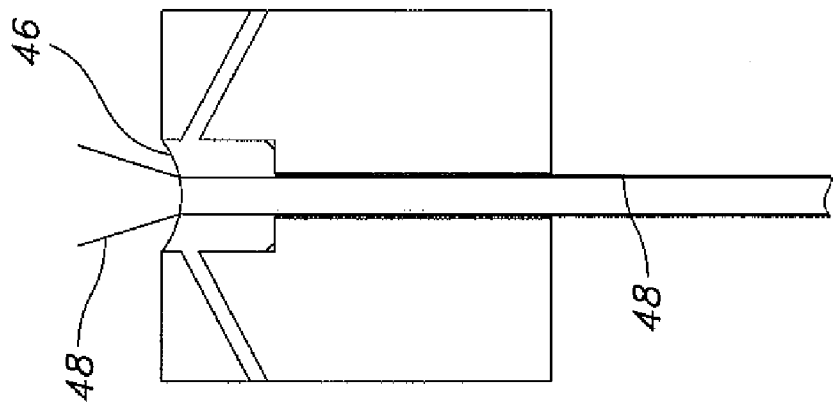
FIG. 15 is an illustration of a concave termination and two light rays which diverge after exiting from the termination, according to various embodiments of the present invention.

FIG. 15 illustrates a termination having a concave surface portion 46, as cast by the arrangement illustrated in FIG. 14. The concave surface portion 46 causes parallel light rays 48 from optical fiber 10 to be diverged, as shown.

FIG. 16 illustrates an arrangement for casting a termination having an angled surface portion 52. Housing 12 is covered by mold portion 50 having an angled surface portion 51.

FIG. 17 illustrates a termination having an angled surface portion 52, as cast by the arrangement illustrated in FIG. 16. The angled surface portion 52 causes parallel light rays 54 from optical fiber 10 to be redirected, as shown.

Figure 18:
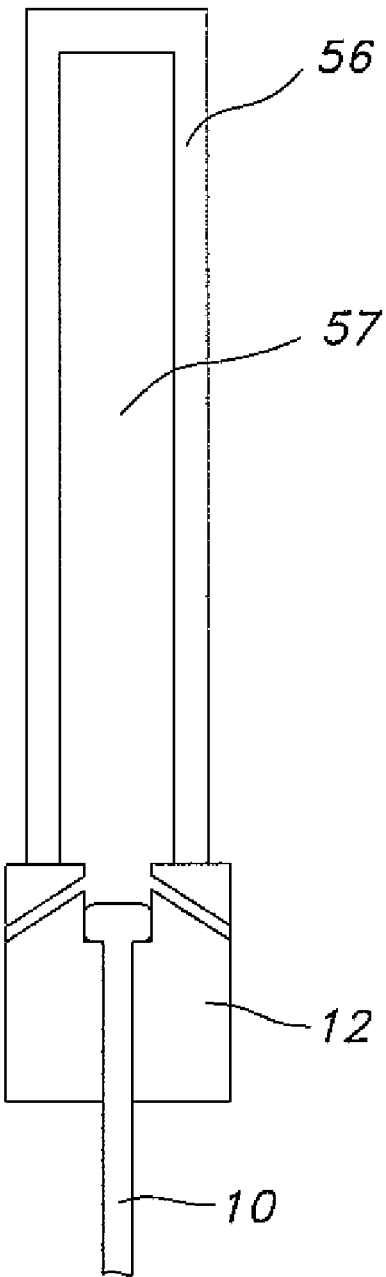
FIG. 18 is an illustration of a balled fiber in a housing, the balled fiber creating a shut-off for molding, and a mold portion configured to form the termination as a light pipe, according to various embodiments of the present invention.

FIG. 18 illustrates an arrangement for casting a termination formed as a light pipe. Housing 12 is covered by mold portion 56, which defines a cavity 57 for forming a light pipe.

Figure 19:
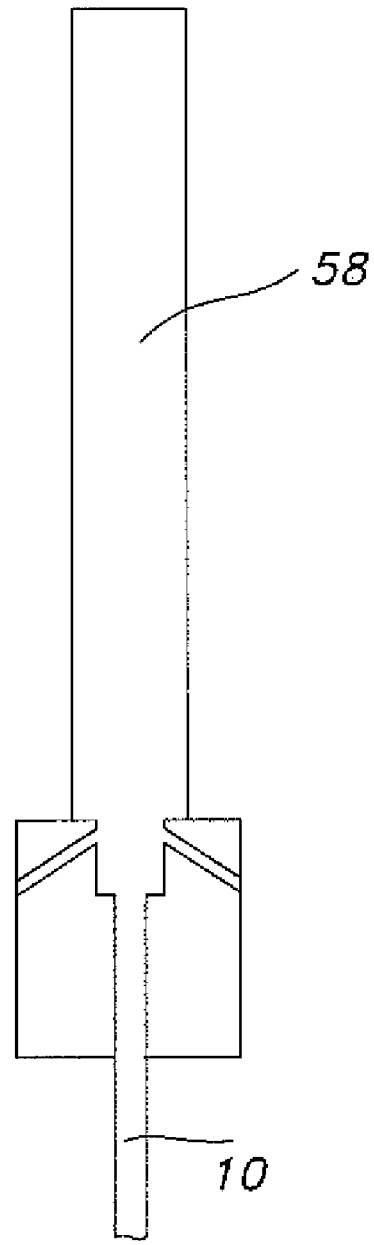
FIG. 19 is an illustration of an optical fiber with a termination formed as a light pipe, according to various embodiments of the present invention.

FIG. 19 illustrates a termination formed as a light pipe 58, as cast by the arrangement illustrated in FIG. 18. Light pipe 58 may be integral with optical fiber 10.

Figures 20, 21:
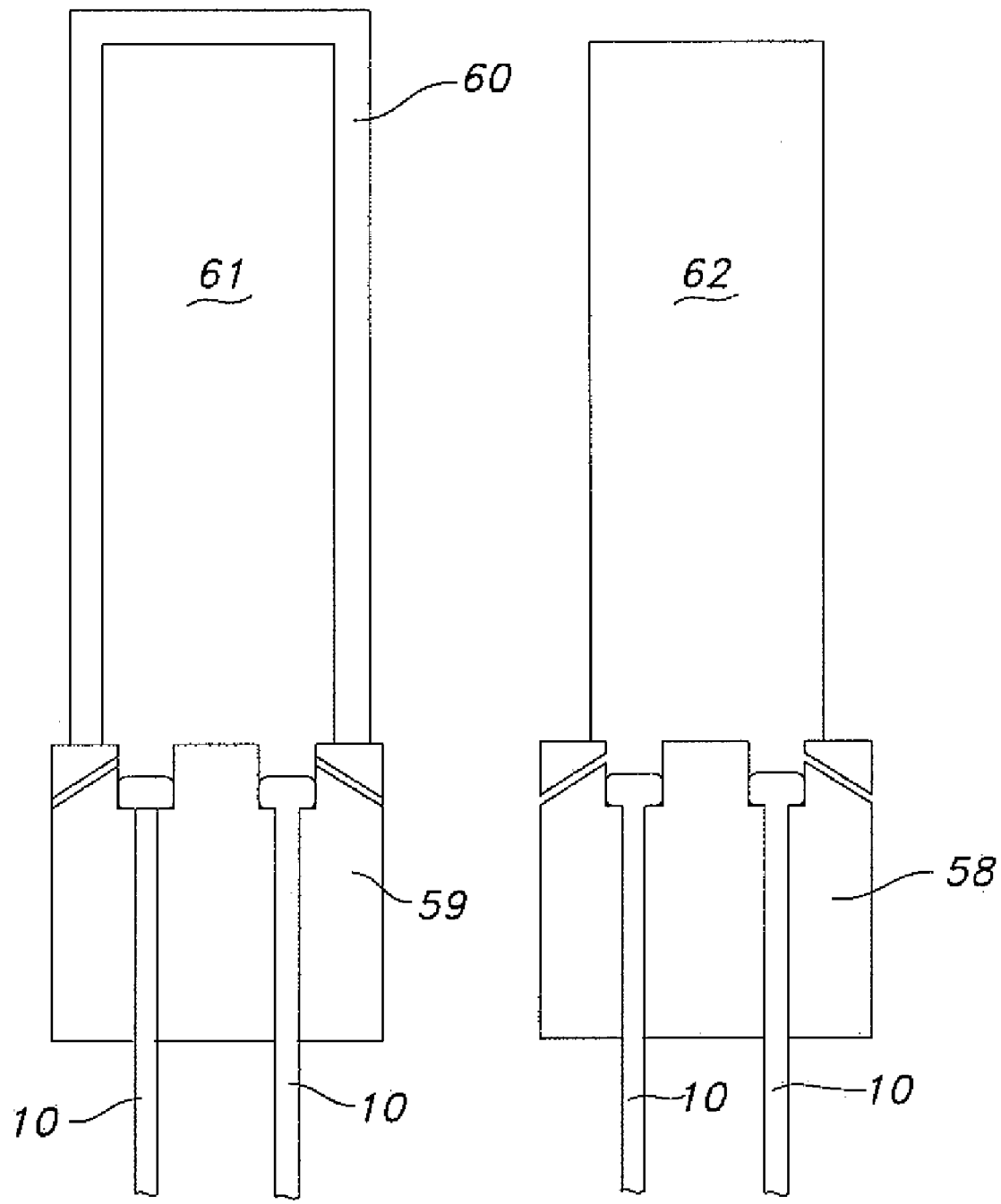
FIG. 20 is an illustration of two optical fibers entering a housing, and a mold portion to define a cavity for casting a light mixer for mixing the light from the two optical fibers, according to various embodiments of the present invention.
FIG. 21 is an illustration of two optical fibers terminating in a termination formed as an optical mixer, according to various embodiments of the present invention.

FIG. 20 illustrates an arrangement for casting a termination formed as a light mixer. Housing 59, which accommodates a plurality of optical fibers, is covered by mold portion 60. Housing 59 and mold portion 60 cooperate to define a cavity 61 for forming a light mixer for mixing light from the plurality of optical fibers.

FIG. 21 illustrates a light mixer 62, as cast by the arrangement illustrated in FIG. 20. Light mixer 62 is integral with optical fibers 10 and serves to mix the light from the two optical fibers 10.

Figure 22:
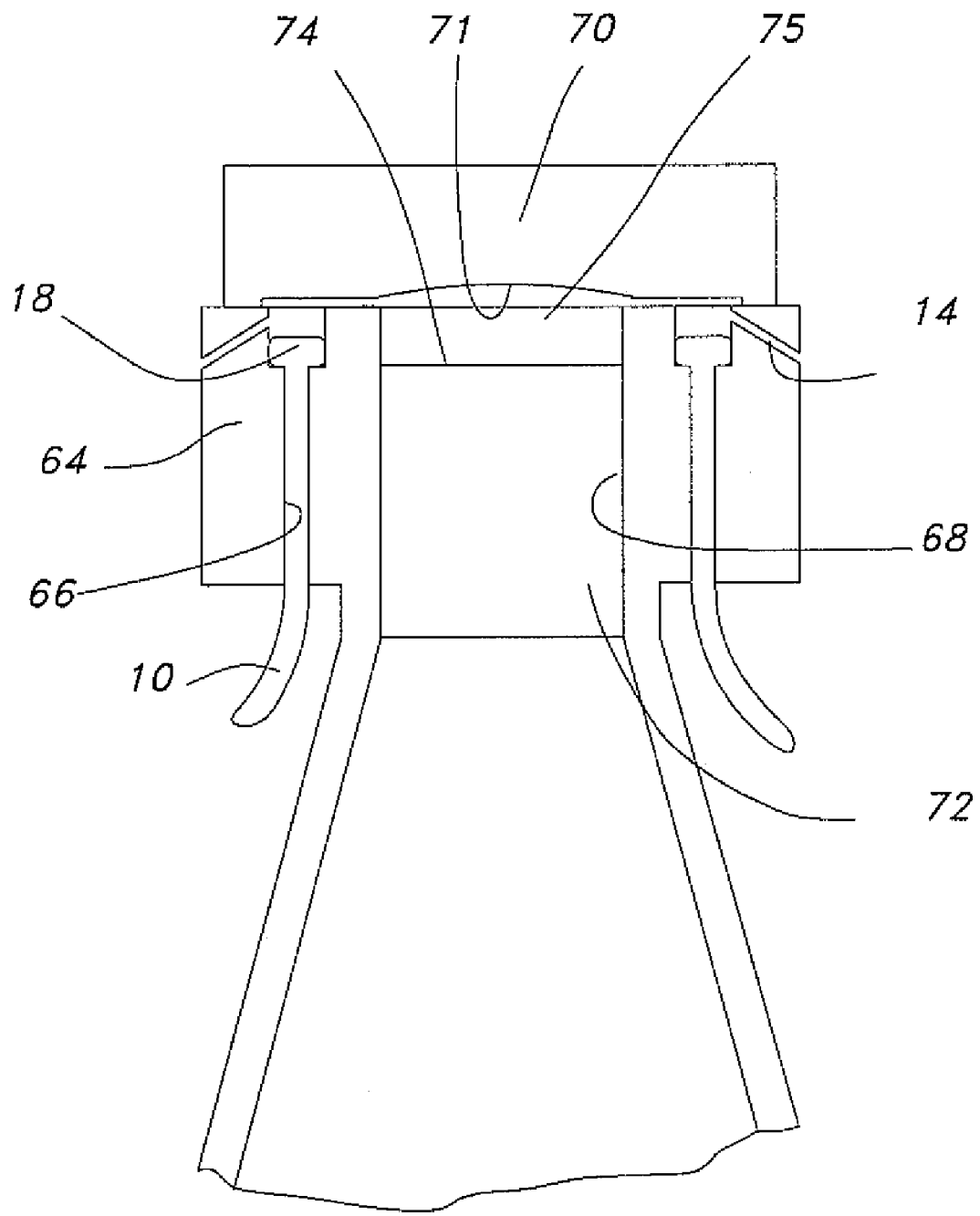
FIG. 22 is a sectional sketch of a casting arrangement for providing terminations for a plurality of optical fibers, and a lens for receiving light reflected back from a subject, according to various embodiments of the present invention.

FIG. 22 illustrates an arrangement for casting a termination on at least one optical fiber 10 in conjunction with a lens. The lens may be used, for example, for receiving light back from a subject illuminated by the fiber(s) or for transmitting light to a subject. Housing 64 has one or more small passages 66 to accommodate one or more optical fibers, and it has a large passage 68 to accommodate light from the lens. To make the casting, one or more optical fibers 10 are placed in the small passages 66 and, optionally, they may be balled as shown. A first mold portion 70 may be placed over housing 64 and a second mold portion 72 may be placed in the large passage 68. The housing 64, first mold portion 70 and second mold portion 72 define a cavity 75 for the lens. Surface 74 of second mold portion 72 may be polished, and first mold portion 70 may have a concave surface portion 71. Runners 14 in housing 64 are for injection of the melt used to form the termination and the lens.

Figure 23:
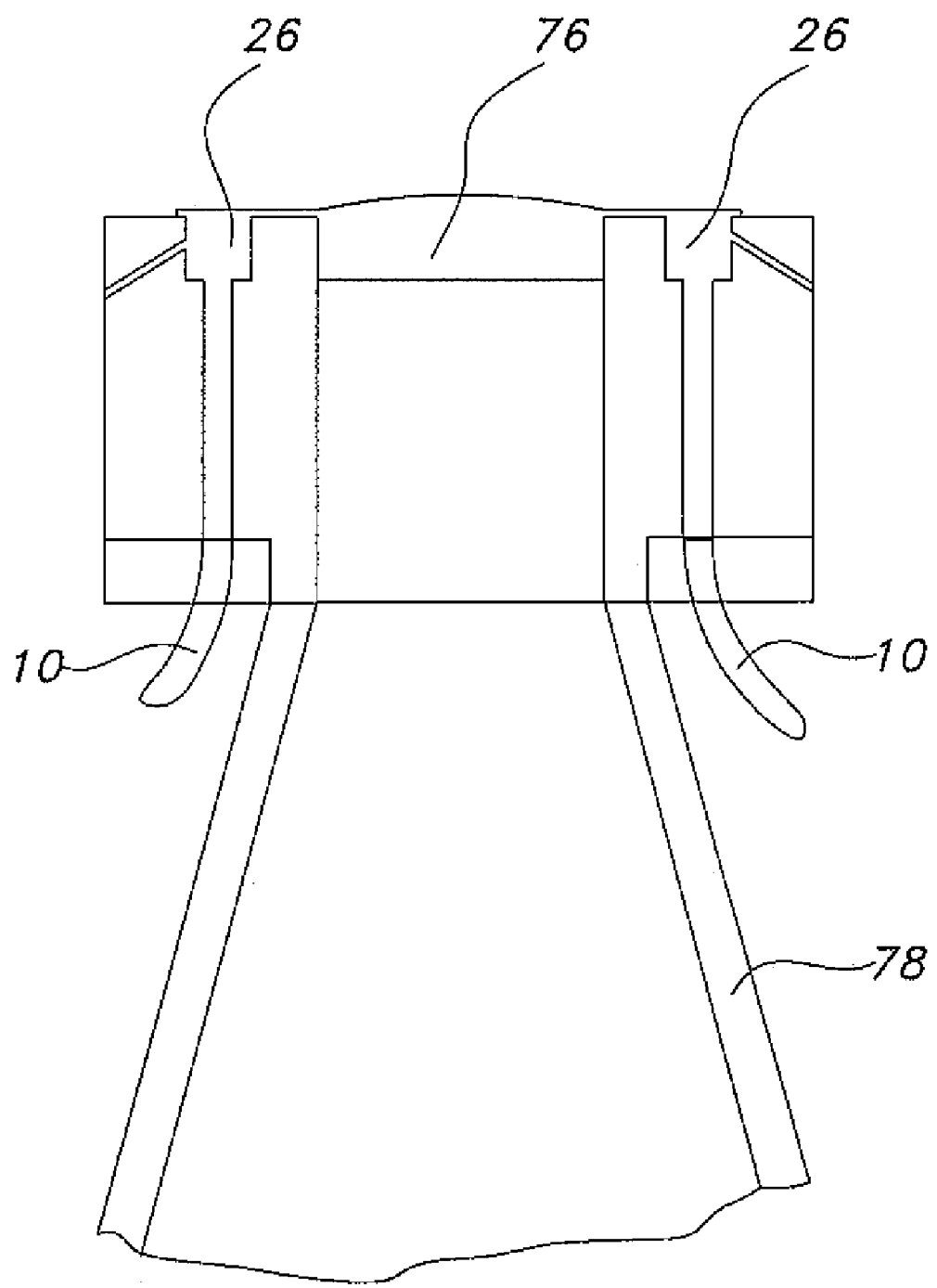
FIG. 23 is an illustration of a plurality of optical fibers with terminations that are integral with a lens for receiving light reflected back from a subject, according to various embodiments of the present invention.

FIG. 23 illustrates a termination 26 and lens 76 generated according to the arrangement of FIG. 22. Optical fiber(s) 10 pass through housing 64 and are terminated by terminations 26, which are integral with lens 76. Housing 64 may include a light cone 78. A camera, photocell, spectrometer, or other light-sensing device (not shown) is to be placed below the light cone 78.

Figure 24:
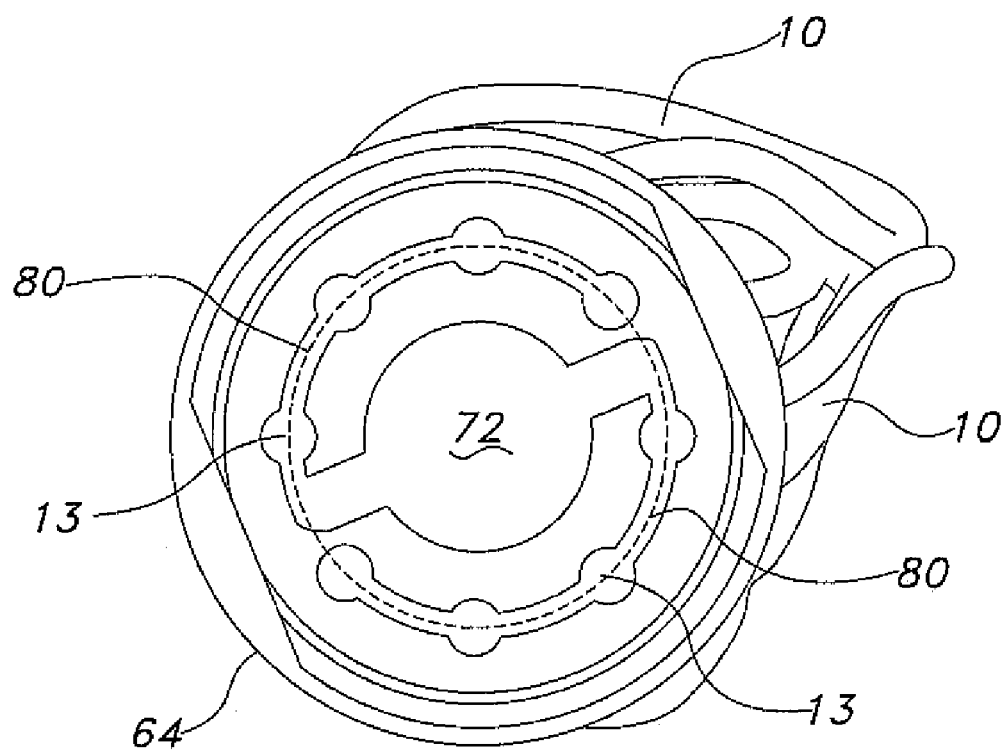
FIG. 24 is an end view of eight optical fibers and a housing for casting terminations integral with a central lens, according to various embodiments of the present invention.

FIG. 24 is a top view of the housing 64 before the first mold portion 70 is put in place. The second mold portion 72 is shown, and counterbores 13, which are connected by runners 80. Counterbores 13 and runners 80 are in fluid communication with runners 14 illustrated in FIG. 23.

Figure 25:
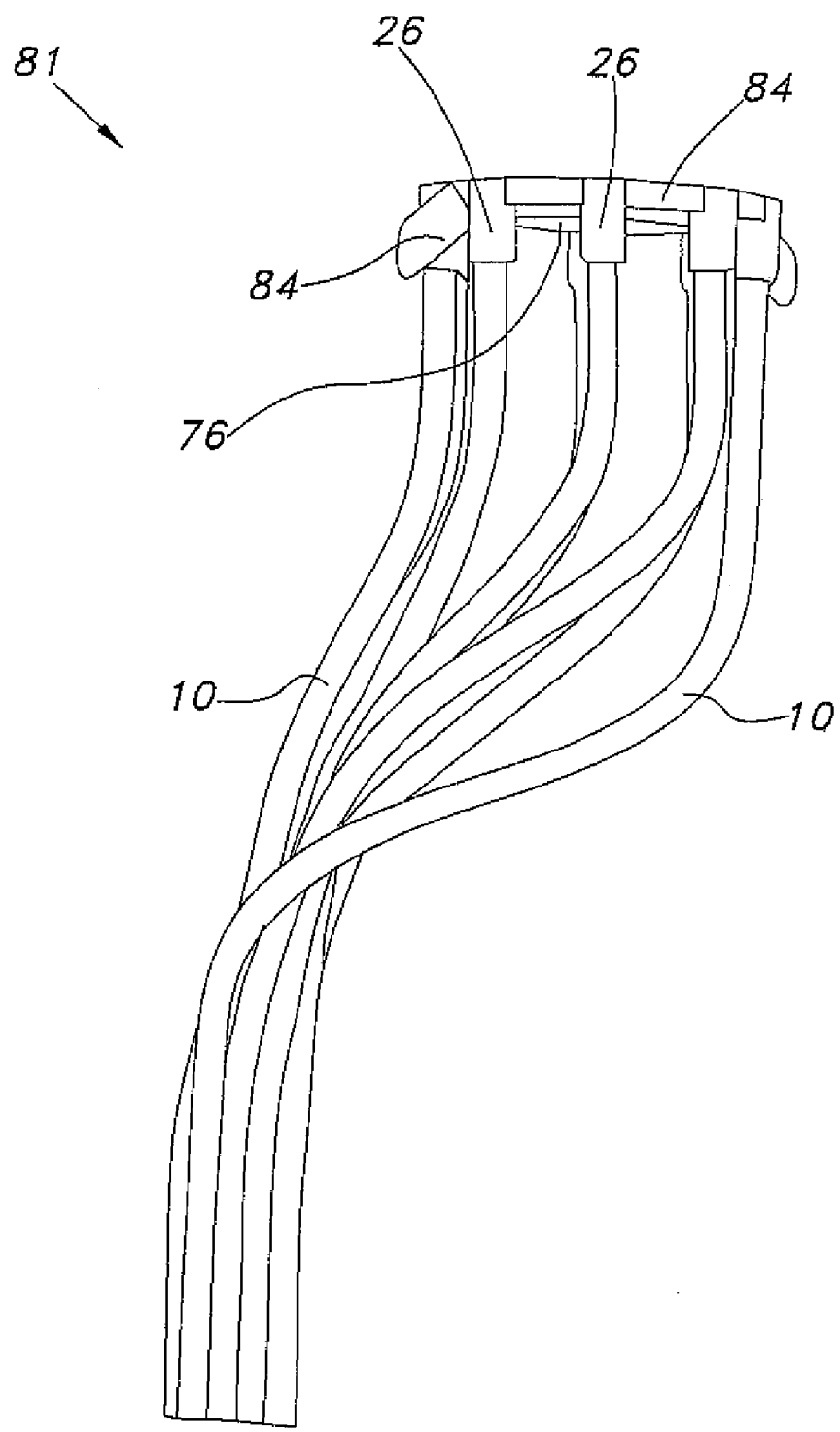
FIG. 25 is a perspective sketch of the eight optical fibers shown in FIG. 24, their terminations, and sprue from the preferred runner arrangement, according to various embodiments of the present invention.

FIG. 25 is an illustration of the integral unit 81 comprised of optical fibers 10, their terminations 26 and integral lens 76. Sprue 84 formed in runners 14 and 80 is also shown. In various embodiments, the entire integral unit 81, as shown in FIG. 25, would not be seen because much of it would be embedded in housing 64.

Figure 26:
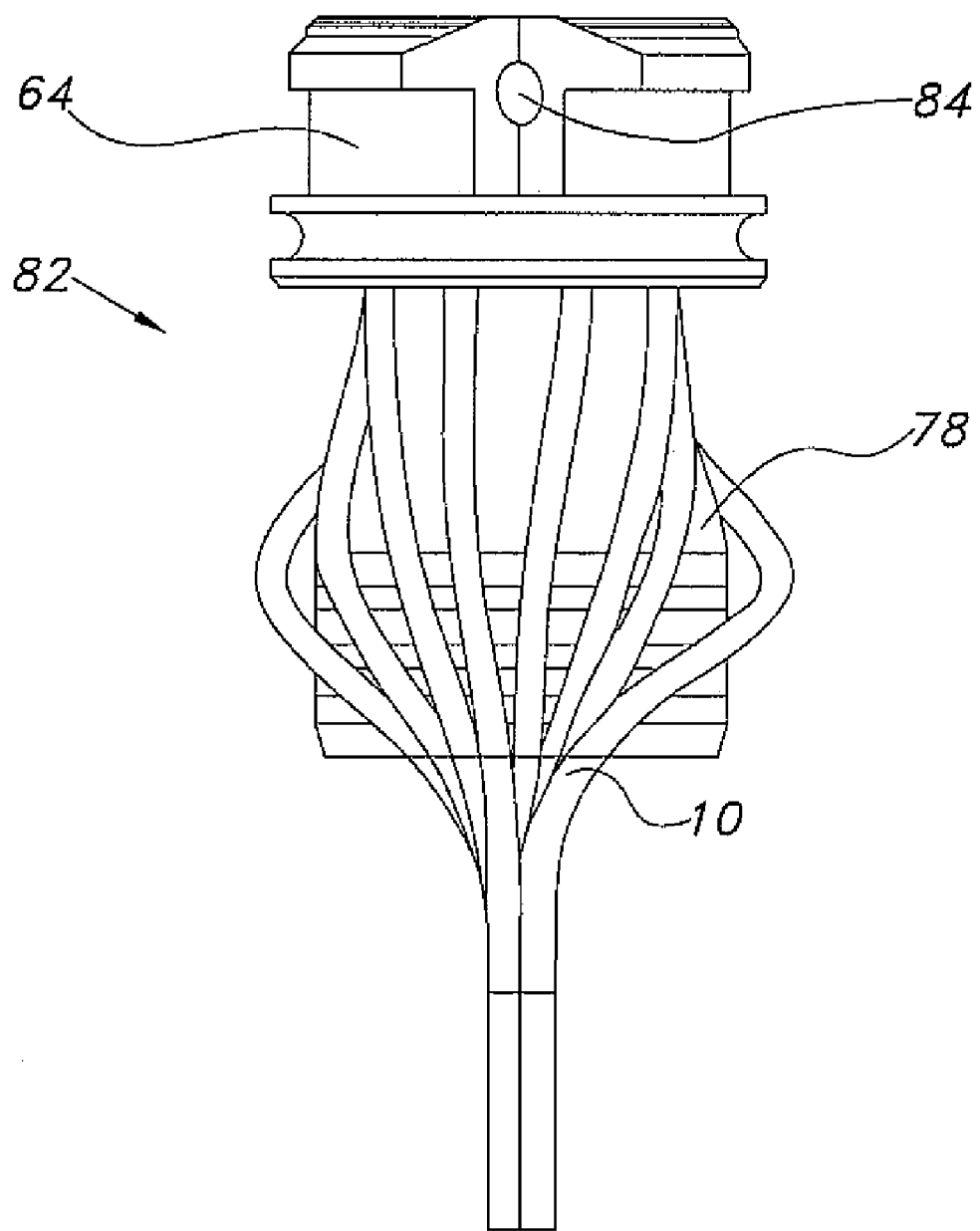
FIG. 26 is a perspective side view of the housing and eight optical fibers shown in FIG. 24, according to various embodiments of the present invention.

FIG. 26 is a side view of the optical assembly 82 made by this process. The housing 64 with its light cone 78 can be seen, as well as the fibers 10.

Figure 27:
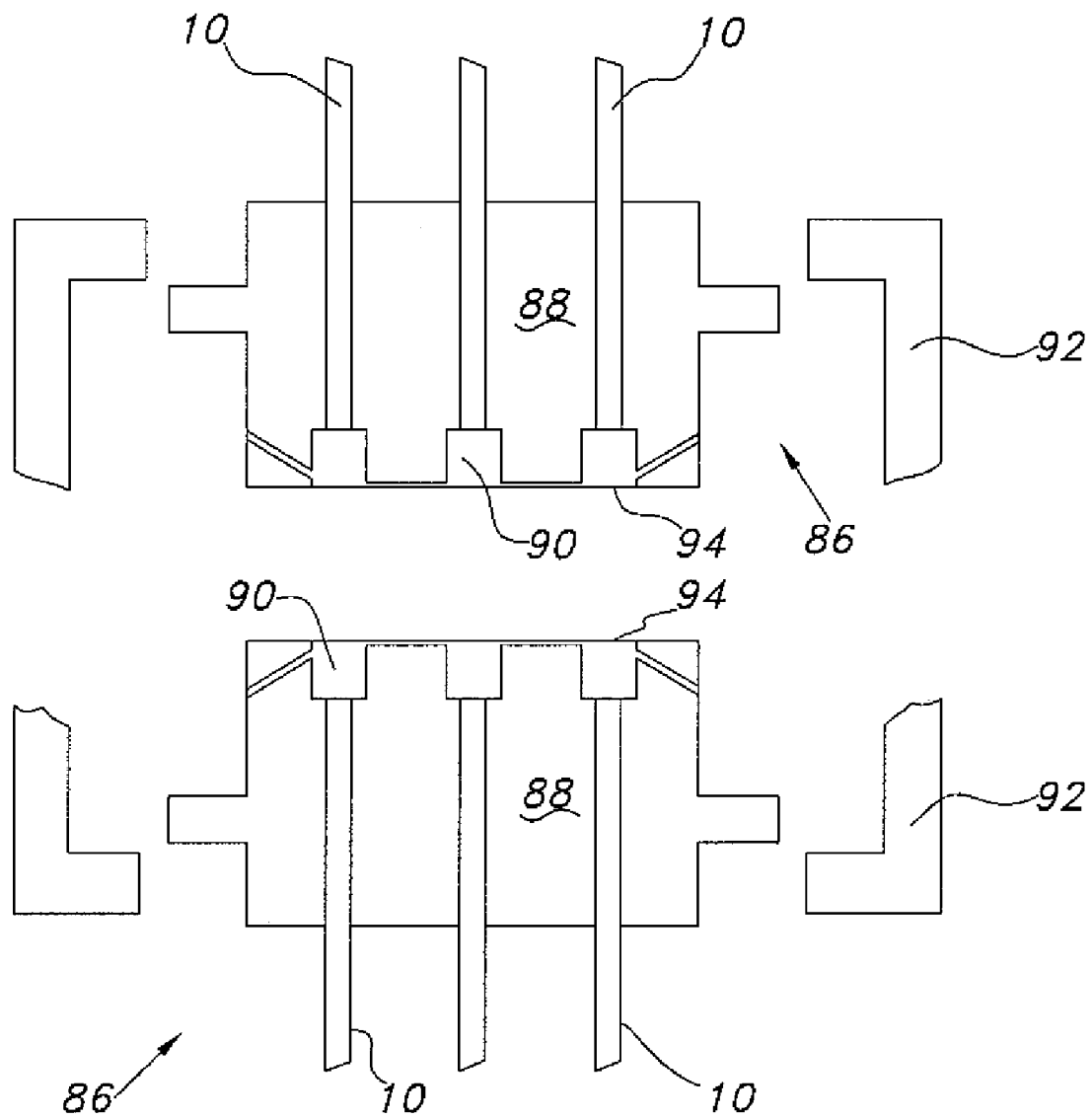
FIG. 27 is a schematic illustration for a connector pair for joining a first at least one optical fiber to a second at least one optical fiber, according to various embodiments of the present invention.

FIG. 27 illustrates a pair of connectors 86 for providing optical communication between a first at least one optical fiber 10 and a second at least one optical fiber 10. Each connector 86 may include a housing 88. One or more optical fibers 10 may be inserted into housing 88 and a termination 90 may be cast onto the fibers 10, as discussed previously. Termination 90 may have planar surface portions 94. Connectors 86 may be held together by attachment device 92, which, preferably, engages housings 88.

Figure 28:
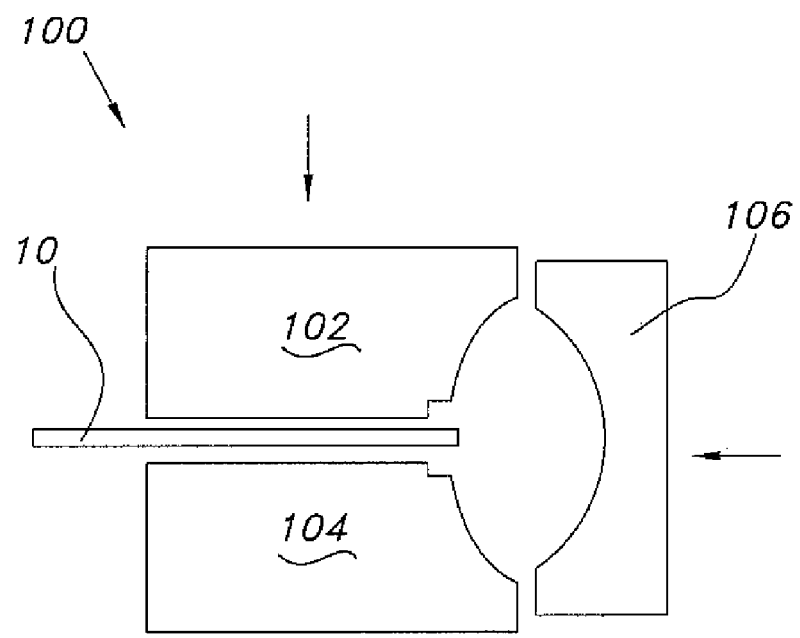
FIG. 28 is a schematic illustration of mold portions being brought together for casting a termination on an optical fiber without including a housing in the final product, according to various embodiments of the present invention.

FIG. 28 illustrates an arrangement 100 for casting a termination on an optical fiber 10. Arrangement 100 differs from the arrangements previously discussed because no housing is involved.

Figure 29:
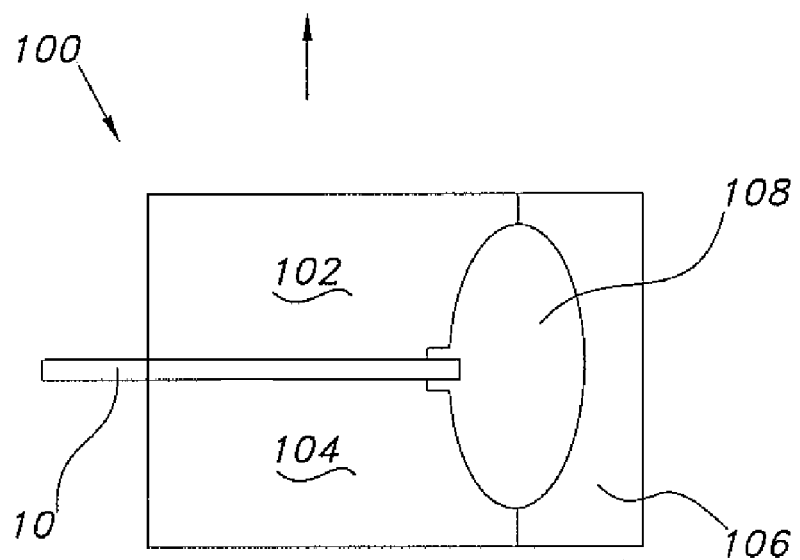
FIG. 29 is a schematic illustration of the mold portions shown in FIG. 28 positioned for casting the termination, according to various embodiments of the present invention.
Figure 30:
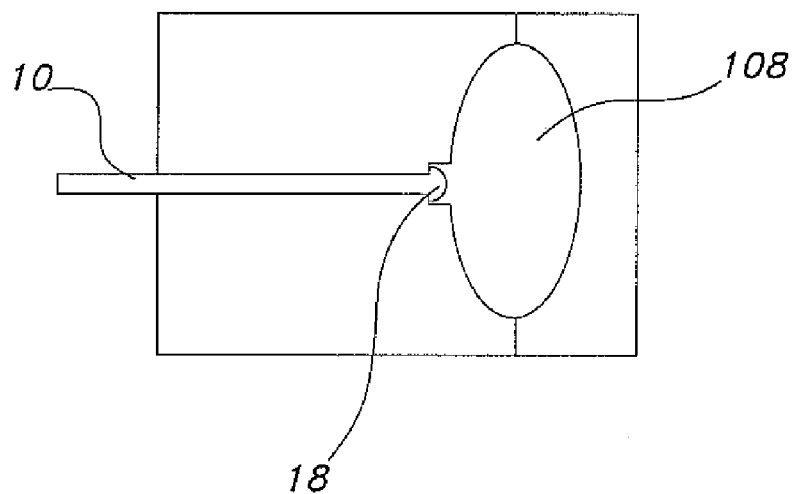
FIG. 30 illustrates a fiber with a balled end prior to casting, according to various embodiments of the present invention.
Figure 31:
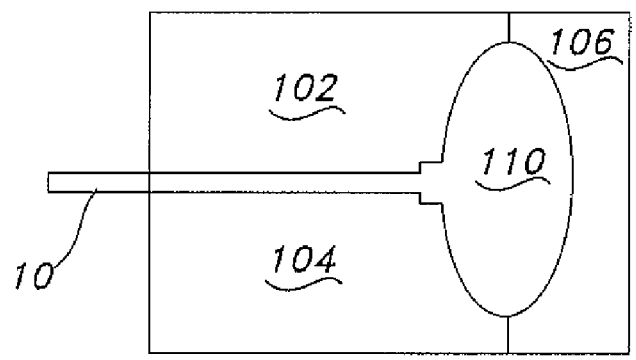
FIG. 31 illustrates the termination integral with the optical fiber after casting, according to various embodiments of the present invention.

Arrangement 100 includes a first mold portion 102, a second mold portion 104 and a third mold portion 106. These are brought together as illustrated in FIG. 29 to define a cavity 108. The optical fiber 10 may be clamped between mold portions 102 and 104, or, alternatively, a balled end 18 may be formed on optical fiber 10, as illustrated in FIG. 30. FIG. 31 illustrates a termination 110 formed on optical fiber 10.

Figure 32:
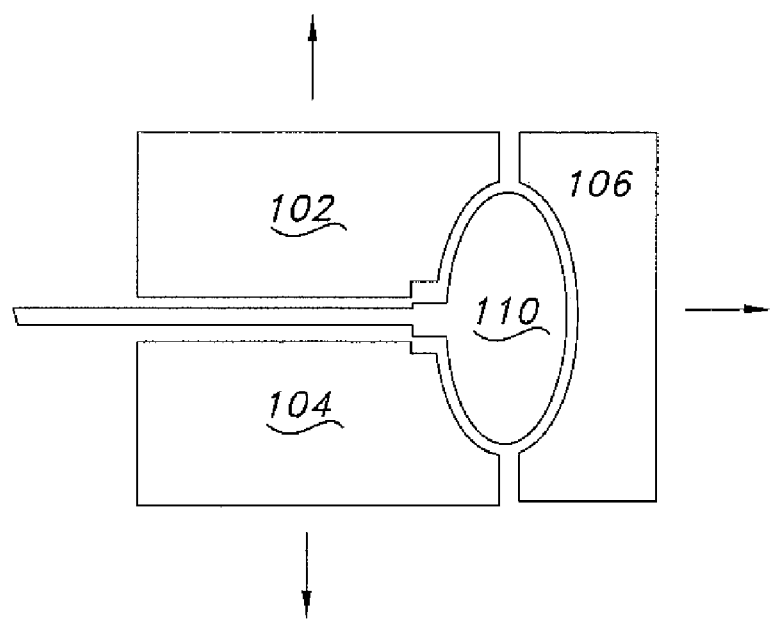
FIG. 32 illustrates the termination as the mold is being opened, according to various embodiments of the present invention.
Figure 33:
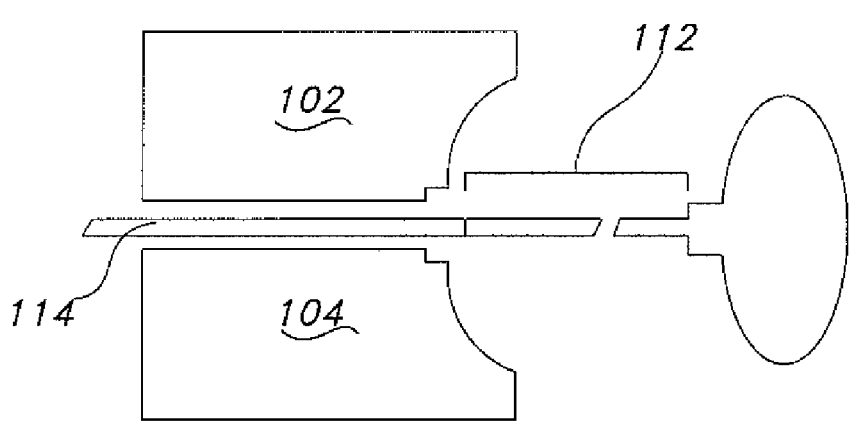
FIG. 33 illustrates the termination integral with the optical fiber after it has been pulled away from the mold and cut to a preferred length, according to various embodiments of the present invention.

FIGS. 32 and 33 illustrate a method for removing the fiber 10 with its termination 110, and for pulling in a new length of fiber. In FIG. 32, the mold portions 102 and 104 are pulled apart, and mold portion 106 is removed. In FIG. 33, the termination is pulled away, and a preferred length 112 of fiber 10 is pulled out. The fiber is then cut at the preferred length 112.

Figure 34:
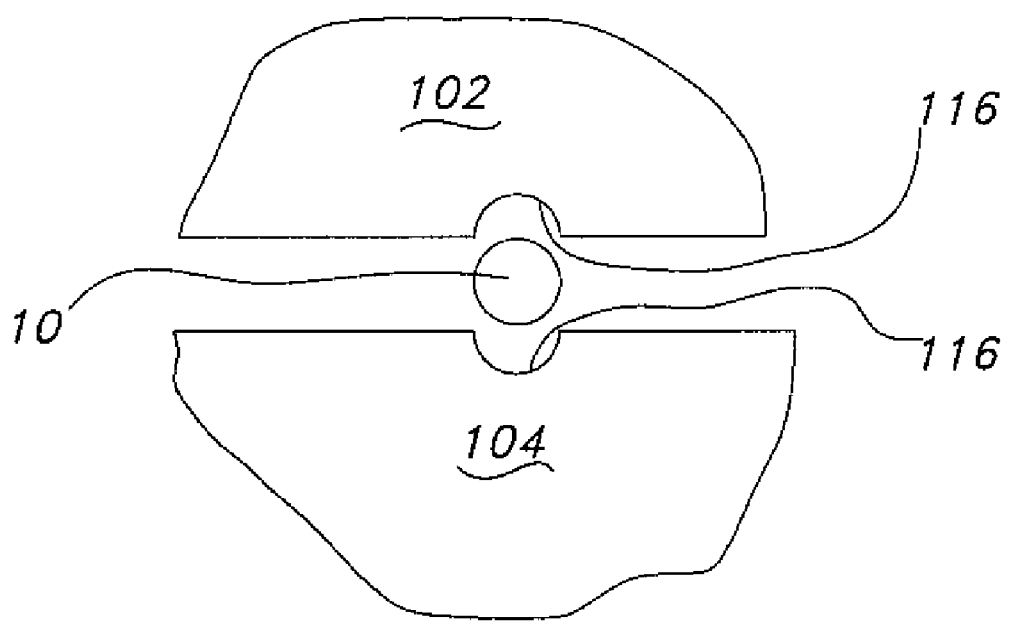
FIG. 34 illustrates the parting surfaces of the mold portions, according to various embodiments of the present invention, with grooves for clamping the fiber therebetween.

FIG. 34 illustrates grooves 116 which may be provided on mold portions 102 and 104 for clamping fiber 10. In an alternative embodiment, mold portions 102 and 104 do not separate. In the alternative embodiment, the fiber is pulled into a small passage which does not clamp it. In that case, the fiber end may be balled to withstand the pressure during casting.

Figure 35:
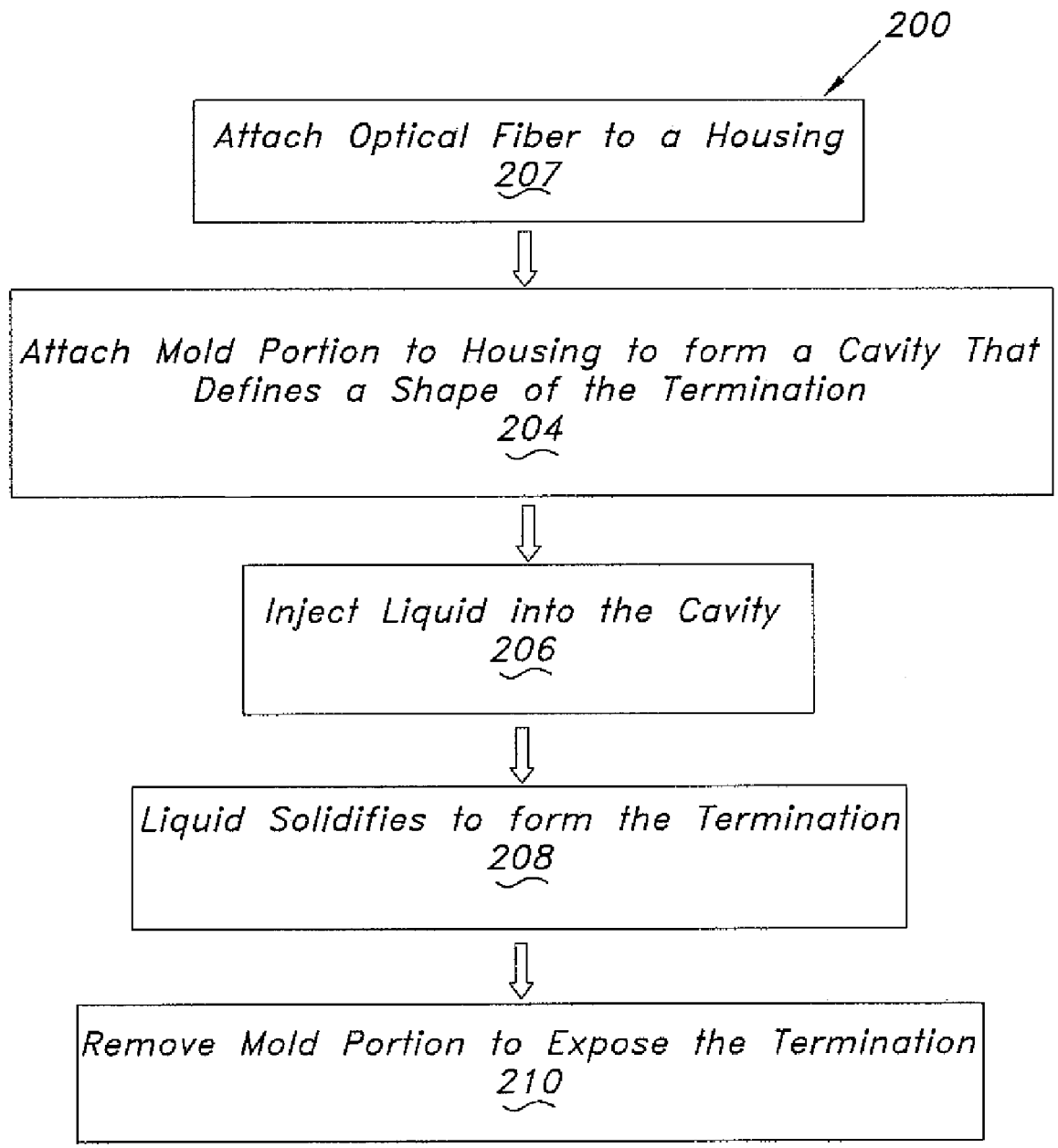
FIG. 35 is a flowchart, according to various embodiments of the present invention, illustrating a method for making an optical fiber with a termination, wherein a housing is included in the final product.

FIG. 35 shows a flowchart 200 illustrating a method, according to some embodiments of the present invention, for making an optical fiber with a termination. At step 202, the optical fiber is attached to a housing. At step 204, a mold portion may be attached to cover the housing so that the housing and mold portion define a cavity. A liquid is injected into the cavity at step 206. The liquid may solidify at step 208 to form the termination. At step 210, the mold portion may be removed to expose the termination. The housing may remain as a portion of the final product, or, in various embodiments of the present invention, may be removed.

Figure 36:
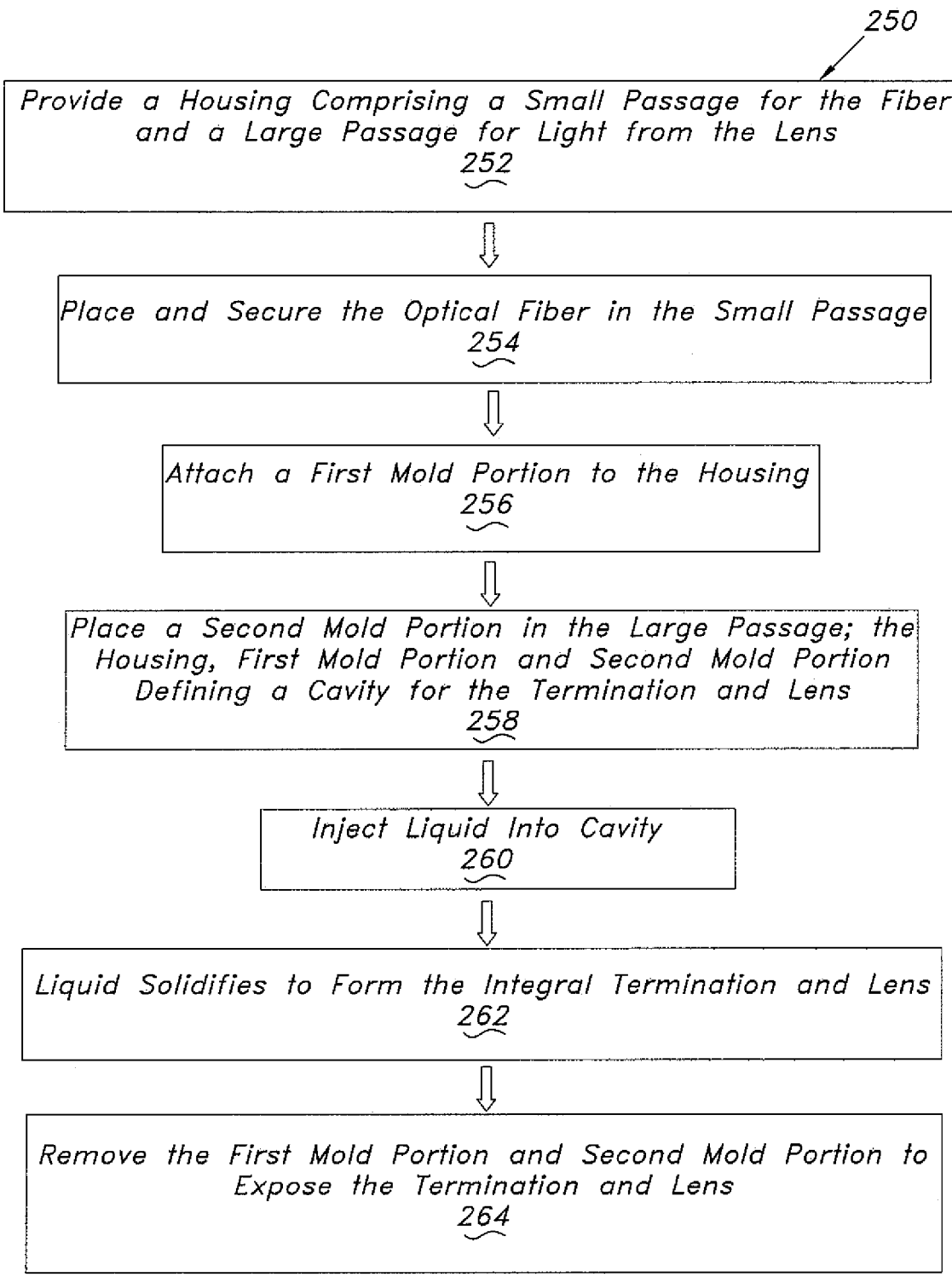
FIG. 36 is a flowchart, according to various embodiments of the present invention, illustrating a method for making an optical fiber with a termination and a lens.

FIG. 36 shows a flowchart 250 illustrating a method, according to some embodiments of the present invention, for making an optical fiber with a termination and a lens integral with the termination. At step 252, a housing is provided that has a small passage for the fiber, and a large passage for light from the lens. The optical fiber may be placed in the small passage and secured therein at step 254. A first mold portion may be attached to the housing at step 256, and a second mold portion may be placed in the large passage at step 258. The housing, the first mold portion and the second mold portion may define a cavity for casting the termination and lens. Liquid is then placed in the cavity at step 260. At step 262, the liquid may solidify to form the termination and lens. The first and second mold portions are then removed at step 264 to expose the termination and lens. The housing may remain as a portion of the final product, or, in various embodiments of the present invention, it may be removed.

Figure 37:
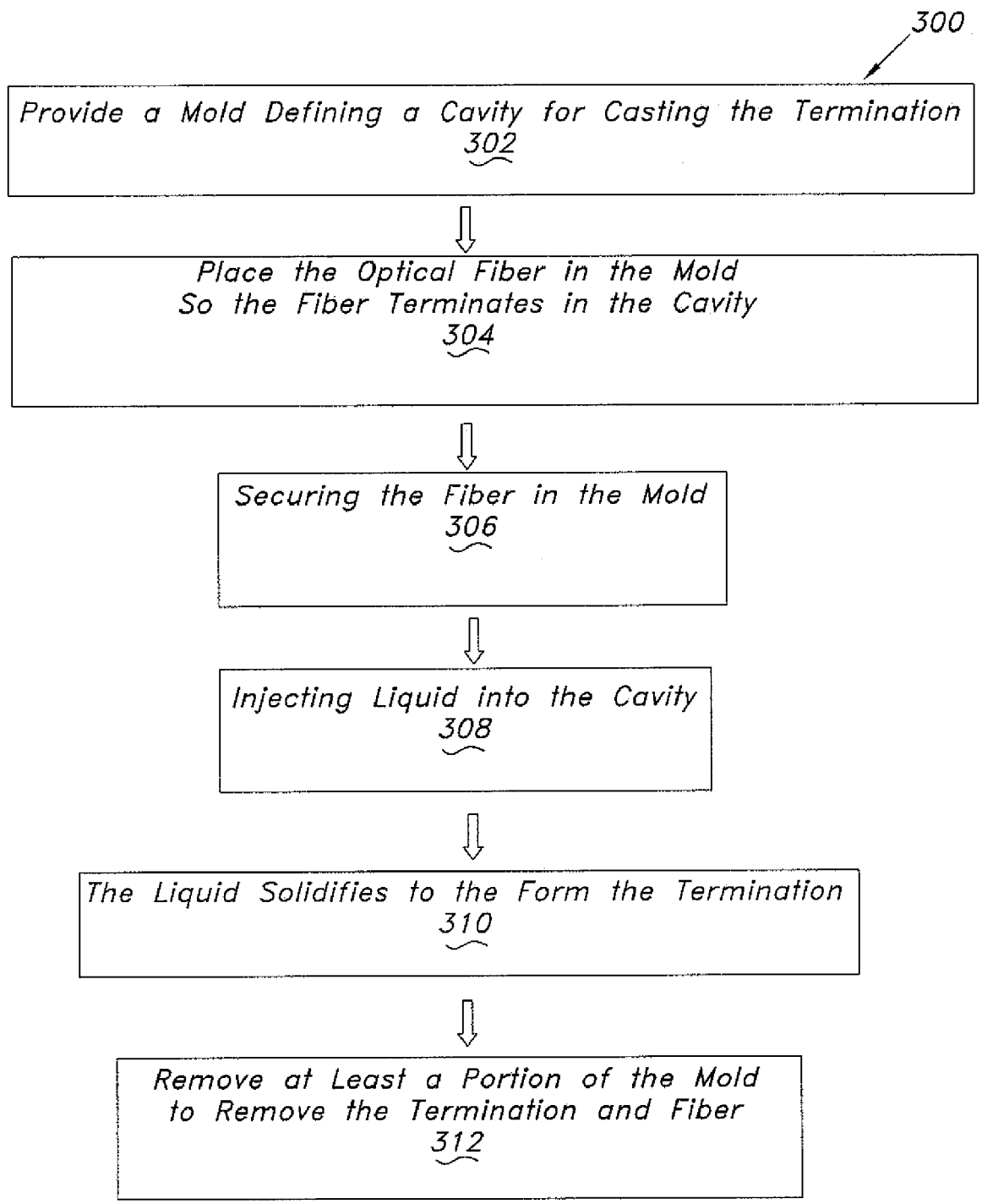
FIG. 37 is a flowchart, according to various embodiments of the present invention, illustrating a method for making terminations on optical fibers.

FIG. 37 is a flowchart 300 illustrating a method, according to some embodiments of the present invention, for making an optical fiber with a termination. At step 302, a mold is provided that defines a cavity for casting the termination. At step 304, the optical fiber is placed in the mold so that the fiber terminates in the cavity. The fiber may be secured in the mold at step 306. Liquid is placed in the cavity at step 308. At step 310, the liquid may be allowed to solidify, forming the termination. At step 312, at least a portion of the mold may be removed so that the termination and fiber can be removed.

Figure 38A:
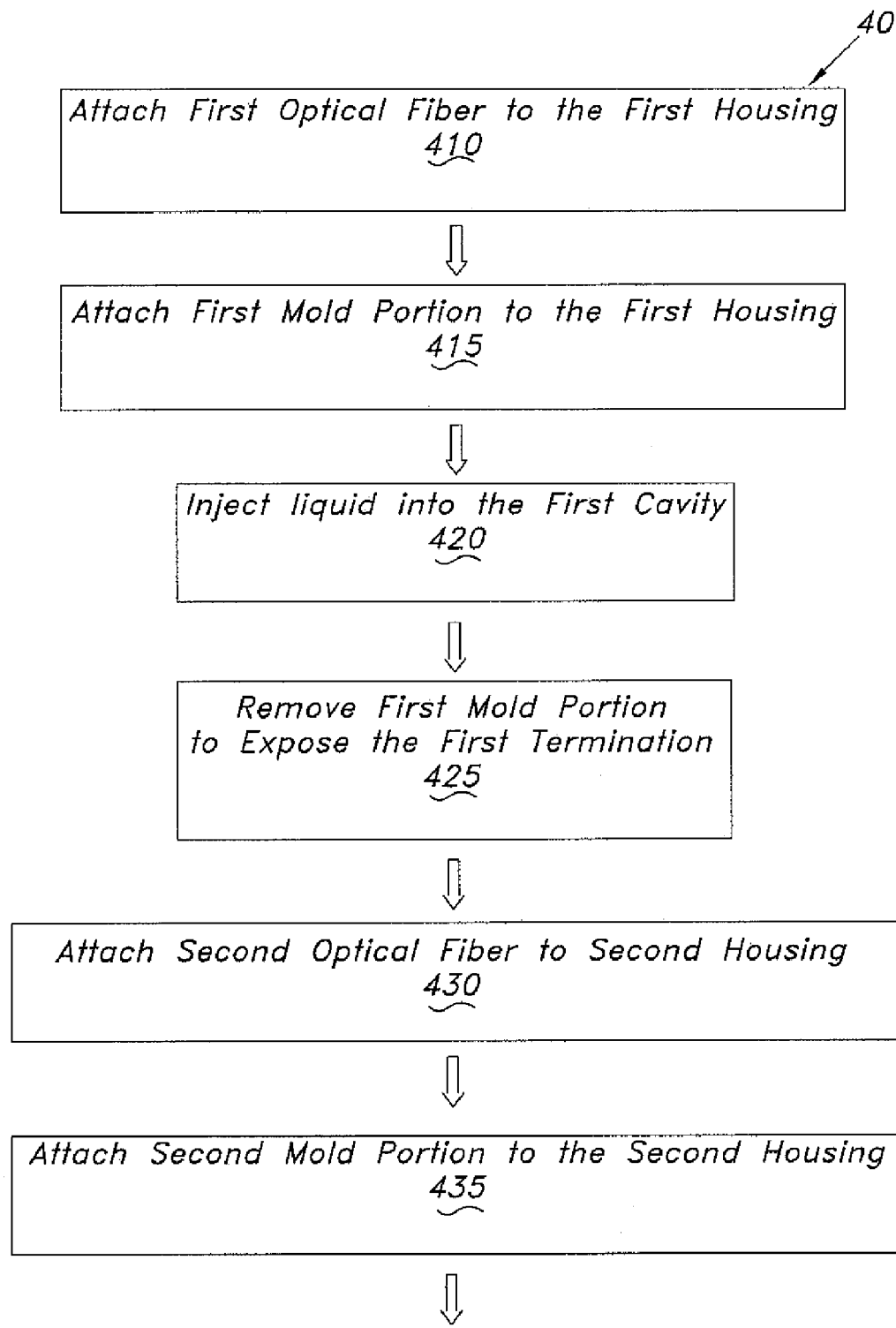

FIG. 38A is a flowchart 400 illustrating a method, according to some embodiments of the present invention, for connecting a first optical fiber to a second optical fiber. In step 410, the first optical fiber is attached to a first housing. In step 415, a first mold portion is attached to the first housing to define a first cavity. In step 420, liquid is injected into the first cavity, the liquid solidifying to form a first termination including a first flat surface portion. The first mold portion is then, in step 425, removed to expose the first termination.

In step 430, the second optical fiber is attached to a second housing. A second mold portion may be attached to the second housing at step 435, so that the second housing and the second mold portion define a second cavity. Referring now to a continuation of the flowchart 400 at FIG. 38B, liquid is injected into the second cavity, at step 440, to firm a second termination including a second flat surface portion. In step 445, the second mold portion is removed to expose the second termination.

In step 450, the first mold portion is attached to the second mold portion so that the first flat surface portion is adjacent the second flat surface portion and the first optical fiber is in optical communication with the second optical fiber. The first mold portion may be attached to the second mold portion by an attachment device engaging the first housing and the second housing. Preferably, the first termination and the second termination are both transparent. A gel matching the index of refraction of the terminations may be placed between the flat surface portions to enhance the optical communication between the fibers.

While various embodiments of the invention have been described in the preceding discussion, it should be understood that the invention encompasses many other embodiments, within the scope of the attached claims.

We claim:

1. A method for providing a termination on an optical fiber, said method comprising:
   attaching said optical fiber to a housing by (i) forming at least one passage through said housing, said at least one passage having a distal end and a proximal end; (ii) inserting said optical fiber through said passage; (iii) positioning the end of said fiber at about said proximal end of said passage; and (iv) applying heat to said proximal end of said fiber to increase the diameter of said fiber so that said fiber is pressed against said passage;
   attaching a mold portion to said housing so that said mold portion and said housing form a cavity, said cavity defining a shape of said termination;
   injecting a liquid into said cavity, said liquid solidifying to form said termination; and
   removing said mold portion to expose said termination.

2. A method according to claim 1 wherein said step of injecting said liquid is done with elevated pressure.

3. A method according to claim 1 wherein said step of applying heat is sufficiently brief that said heat does not penetrate through said housing sufficiently to embrittle said fiber adjacent said distal end of said passage.

4. A method according to claim 1, further comprising applying cooling at said distal end of said passage.

5. A method according to claim 1 wherein said termination is transparent and has substantially the same index of refraction as said optical fiber.

6. A method according to claim 1 wherein said mold portion is configured to form on said termination at least one of:
   a planar surface portion;
   a convex surface portion;
   a concave surface portion; and
   an angled surface portion.

7. A method according to claim 1 wherein said proximal end of said passage comprises a counterbore wherein said step of applying heat to said proximal end of said fiber causes said fiber to expand into said counterbore.

8. A method according to claim 1 further comprising the step of selecting for said housing a material to which said fiber adheres as a result of said heat.

9. A method according to claim 1 wherein said termination comprises a light pipe.

10. A method according to claim 1 wherein said optical fiber comprises a plurality of optical fibers, and said termination comprises an optical mixer.

11. A method according to claim 1 wherein said optical fiber is acrylic.

12. A method according to claim 1 wherein said termination is acrylic.

13. A method according to claim 1, wherein injecting said liquid into said cavity comprises injecting said liquid through at least one runner defined by the housing.

* * * * *